United States Patent [19]

Bean

[11] 4,396,741

[45] Aug. 2, 1983

[54] PHOTOMETER-CONTROLLED ANIONIC POLYMERIZATION

[75] Inventor: Arthur R. Bean, Houston, Tex.

[73] Assignee: Shell Oil Company, Houston, Tex.

[21] Appl. No.: 363,684

[22] Filed: Mar. 30, 1982

[51] Int. Cl.$^3$ .................. C08F 4/48; C08F 297/04
[52] U.S. Cl. ............................. 525/51; 525/314; 525/60; 525/340
[58] Field of Search ..................... 525/51; 526/60

[56] References Cited

U.S. PATENT DOCUMENTS

| | | | |
|---|---|---|---|
| 2,975,160 | 3/1961 | Zelinski | 526/340 |
| 3,094,512 | 6/1963 | Short | 526/340 |
| 3,366,611 | 1/1968 | Wofford | 526/340 |
| 3,496,154 | 2/1970 | Wofford | 526/340 |
| 3,498,960 | 3/1970 | Wofford | 526/340 |
| 3,553,295 | 1/1971 | Bean et al. | 526/60 |
| 3,673,166 | 6/1972 | Trepra | 526/340 |
| 3,743,629 | 7/1979 | Fraga | 526/60 |

FOREIGN PATENT DOCUMENTS

| | | |
|---|---|---|
| 888624 | 1/1962 | United Kingdom . |
| 994726 | 6/1965 | United Kingdom . |
| 1283327 | 7/1972 | United Kingdom . |
| 1588509 | 4/1981 | United Kingdom . |

*Primary Examiner*—Stanford M. Levin

[57] ABSTRACT

Random monoalkenyl arene-conjugated diene copolymers are produced by controlling the continuous rate of addition of the conjugated diene monomer to a reactor containing the monoalkenyl arene monomer, organolithium initiator and solvent, the rate being adjusted in response to the photometer measured presence of an active chromophore comprising a lithium ion directly associated with a poly(monoalkenyl arene) carbanion.

11 Claims, No Drawings

PHOTOMETER-CONTROLLED ANIONIC POLYMERIZATION

BACKGROUND OF THE INVENTION

1. Field of the Invention

The invention relates to a process for preparing a random monoalkenyl arene-conjugated diene copolymer. More particularly, the invention relates to a process for preparing an anionic random monoalkenyl arene-conjugated diene copolymer employing a photometer to control the rate of addition of the conjugated diene monomer.

2. Description of the Prior Art

The copolymerization of conjugated dienes and styrene has been widely utilized for some time. The most commonly used process for the copolymerization has been by an emulsion technique utilizing a free radical catalyst such as an organic peroxide or hydroperoxide. More recently, styrene-diene random copolymers have been prepared by the solution polymerization of styrene and a conjugated diene with organolithium initiators.

With regard to such lithium initiation, it is known that in the batchwise copolymerization, the diene monomer polymerizes considerably faster than the styrene monomer. As a result of this, if no special measures are taken, tapered block copolymers are formed (see e.g. U.K. Pat. No. 888,624).

Several attempts have already been made to counteract this block formation and to promote the formation of copolymers of which the monomer units are distributed more statistically over the polymer molecule. For instance, a process has been proposed in which the two monomers are added at a rate lower than the normal polymerization rate of the system under the conditions applied (U.S. Pat. No. 3,094,512), which means that the monomers are added in such a way that a complete reaction takes place while the addition is going on. This implies that, if application of a relatively low polymerization temperature, for instance, below 110° C., is desired, the monomers should be added very slowly and in accurately determined quantities, as a result of which the process is time-consuming and the polymer yield per unit of time small.

By polymerization at higher temperatures the monomer addition can indeed be made to proceed faster, but then thermal decomposition of the initiator may take place at an unacceptable rate. In addition the harmful influence of the higher temperature on the polymer formed is greater. Moreover, when styrene is applied as the vinylaromatic compound, a high polymerization temperature is undesirable in view of the risk of thermal homopolymerization of the monomer by free radicals. These objections and risks carry weight at temperatures higher than 90° C. and can particularly become inconvenient at temperatures higher than 150° C.

In the last-mentioned process invariably only one preselected monomer ratio is employed, namely, that at which the monomers are added. The monomer ratio at which the copolymerization starts is equal to this ratio.

Another process for the preparation of statistical copolymers is disclosed in U.K. Pat. No. 994,726. In that patent, random copolymers are prepared by first forming a mixture of a portion of the butadiene monomer and all of the styrene monomer in a ratio selected to give the desired copolymer content. Then the mixture is contacted with a lithium-based catalyst under polymerization conditions. Incremental additions of butadiene monomer are added to maintain the monomer ratio. Again, in this process only one preselected monomer ratio is applied. As during the copolymerization, since no vinylaromatic compound is added, per unit of time a decreasing amount of diene should be supplied. As a result not only the concentration, but also the absolute quantity of each of the monomers present in the reactor steadily decreases. Consequently, though the monomer ratio is kept constant, the monomer concentration, which as a rule is fairly high initially, decreases to a value which is rather low at the end of the copolymerization. It is not easy to control this process since the butadiene is added in discrete, incremental amounts pursuant to pre-selected addition rates. If the calculations are wrong or if conditions change in the reactor, then the resulting polymer will not be statistically random.

Still another copolymerization process is disclosed in U.K. Pat. No. 1,283,327. In that patent both monomers are added continuously to the reactor. The rate of addition of monomer is pre-set at the rate required to maintain the specific concentration of monomers. To maintain a constant copolymer ratio (the definition of a random copolymer) the monomer ratio in the reactor must be constant and will be completely different from the ratio in the polymer. The flow of monomer to the reactor must equal the disappearance of monomer by polymerization. The resulting polymer will become non-random or tapered if the precalculated monomer supply rate is incorrect, if the initial monomer concentration is incorrect, or if the initial monomer ratio is incorrect. For example, if the desired ratio of styrene to isoprene in a polymer is 11:1, preparation of such a polymer by the process of U.K. Pat. No. 1,283,327 would require a monomer ratio of styrene to isoprene of greater than 140:1 due to the extremely high reactivity of isoprene monomer in this system. Precisely maintaining such a monomer ratio is impractical. Another consideration is the extent of thermal termination or dieout of the active polymer chains.

Another approach to making random styrene-diene copolymers is to add a randomizing agent to solution mixtures of diene, styrene and organolithium initiators. Various randomizing agents are disclosed in U.S. Pat. Nos. 2,975,160; 3,366,611; 3,496,154; 3,498,960 and 3,673,166. These strong randomizing agents are typically employed at fairly high levels of addition in order to equalize the diene monomer and styrene monomer reaction rate constants. However, this technique is not always acceptable because altering the polarity of the solvent to the extent of equalizing the rate constants would necessarily result in an unacceptably large change in the microstructure of the diene polymer units. For example, a significant increase in the 3,4 content of isoprene polymer units might result.

A new polymerization process has now been found that overcomes many of the difficulties found in the prior art.

SUMMARY OF THE INVENTION

The present invention is directed to a much improved process for preparing statistically random monoalkenyl arene-conjugated diene copolymers. Further, the present invention may be used to prepare random copolymer blocks as part of a multiblock copolymer. In a specific embodiment the present invention is an improvement in the process for preparing anionic random copolymers, which process comprises:

(a) adding a monoalkenyl arene monomer, minor portion of a conjugated diene monomer and an inert solvent to a reactor;

(b) adding a polymerizing amount of an organolithium initiator to the resulting solution, therein commencing the polymerization of said monoalkenyl arene monomer; and (c) continuously adding a conjugated diene monomer to the solution of step (b);

the improvement comprising controlling the rate of addition of said conjugated diene monomer in step (c) in response to the photometer measured relative presence of an active chromophore comprising a lithium ion directly associated with a poly(monoalkenyl arene) carbanion wherein the desired relative presence has been previously determined to give a desired ratio of monoalkenyl arene monomer units to conjugated diene monomer units in said copolymer.

As expressed in an alternative embodiment, the present invention is an improvement in the process for preparing anionic random copolymers, which process comprises:

(a) adding a monoalkenyl arene monomer, minor portion of a conjugated diene monomer and an inert solvent to a reactor;

(b) adding a polymerizing amount of an organolithium initiator to the resulting solution, therein commencing the polymerization of said monoalkenyl arene monomer; and (c) continuously adding a conjugated diene monomer to the solution of step (b);

the improvement comprising:

(i) continuously sampling the solution of step (c) and determining, by use of a photometer, the relative concentration of active chromophores, said active chromophores comprising a lithium ion directly associated with a poly(monoalkenyl arene) carbanion;

(ii) producing a first signal representative of said concentration;

(iii) comparing said first signal to a predetermined level representative of the desired chromophore concentration to obtain a first control signal, the magnitude of which is related to the difference between said first signal and said predetermined level; and (iv) adjusting the flow rate of said conjugated diene monomer to said reactor responsive to the magnitude of said control signal until the desired level of said concentration is obtained.

The process of the present invention has many advantages over the prior art processes. For one, the process avoids the necessity for large amounts of strong randomizing agents which would otherwise result in a significantly modified diene microstructure by reducing the 1,4 addition. Further, the present invention results in a reduced reaction time (e.g., 1½ to 3 hours) compared to, for example, the process of U.K. Pat. No. 1,283,327. Since all of the monoalkenyl arene monomer is in the starting mixture, the reaction rate is very fast, particularly during the first part of the reaction. Another advantage of the present invention is that there is low thermal dieout of living polymer chains since low temperatures (45°–50° C.) may be utilized with the short reaction times. Still another advantage for the present process is that there is no need to maintain constant reactor temperature or constant initiator concentration in order to insure that a completely random copolymer is obtained. By monitoring the chromophore concentration it is possible to automatically make the necessary adjustments that are required as temperature and initiator concentration change. The resulting polymer has a more statistically random structure (without a modified microstructure for the diene component) than have polymers prepared according to other processes. Further, the process of the present invention is more forgiving and controllable than the prior art processes.

DETAILED DESCRIPTION OF THE INVENTION

The monoalkenyl arene monomers employed herein include styrene, alphamethyl styrene, tertbutyl styrene, paramethyl styrene and other ring alkylated styrenes as well as mixtures of the same. The much preferred monoalkenyl arene is styrene.

The conjugated dienes include specifically 1,3 butadiene, piperylene, and isoprene, with butadiene and isoprene being preferred.

The relative amounts of monoalkenyl arene and diene in the resulting polymers is between about 1% by weight and 80% by weight diene, preferably about 2% to about 50% by weight diene.

The polymers of the present invention are produced by anionic polymerization employing an organomonolithium initiator. The first step of the process involves contacting the monoalkenyl arene, diene and the organomonolithium compound (initiator) in the presence of an inert diluent. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from to 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of −60° to +300° F. and at pressures which are sufficient to maintain the reaction mixture in the liquid phase.

In the first step of the present process, a minor portion of the conjugated diene monomer is added with the entire amount of monoalkenyl arene and the inert solvent. This minor amount is less than 10% weight of the total amount of diene in the random copolymer, preferably about 5 to about 10% by weight of the total amount of diene. This diene is added initially in order to avoid making homopolystyrene while diene flow commences and enters the reactor.

In the next step, the remaining portion of the conjugated diene monomer is continuously added at a specified rate. This rate is in response to the photometer measured relative presence of an active chromophore comprising a lithium ion directly associated with a poly(monoalkenyl arene) carbanion wherein the desired relative presence of said chromophore has been previously determined to give a desired ratio of monoalkenyl arene monomer units to conjugated diene monomer units in said copolymer. There are a number of key aspects to this step of the process. The method and apparatus for measuring the presence of the chromophore is discussed in U.S. Pat. No. 3,743,629, which disclosure is herein incorporated by reference.

According to the '629 patent, the use of the photometer results in a rapid, continuous, and direct indication of the active chain concentration in an active cement comprising living polymers of a lithium ion directly associated with a monoalkenyl arene polymer. This is provided by comparing the absorbance of one narrow band width wavelength of transmitted radiation by an active portion of the cement with the absorbance of a second narrow band with wavelength of transmitted radiation by the same active portion of the cement. This comparison is accomplished using two narrow band wavelengths of radiation in a single cell photometer. This procedure is applicable to reaction admixtures which, in the active state during polymerization, have quantitatively measurable absorbance characteristics (attributable to the living chain ends) for a first predetermined wavelength of radiation which are different from those of the same cement at the same stage of polymerization for a second quantitatively measurable predetermined wavelength of radiation. The procedure is particularly desirable where the background interference is small in comparison with the absorbance of the active chromophore which is associated with the living chain ends.

The indication of the active chain concentration in the polymerization zone may be recorded for visual observation, such as, for example, on a moving graph. In the present invention, the indication of the active chain concentration is converted into a suitable signal which is transmitted through known control devices to regulate or adjust the rate of continuous addition of the conjugated diene monomer as more fully explained below. If desired, both a visual indication, in the form of a moving graph or other means, and automatic regulation of the diene addition may be provided.

A calibration curve is conveniently established by plotting the net photometer readings obtained for the differential absorbance of transmitted radiation against values obtained for the same active cements by known analytic procedures, such as for example, tritium-counting. This analytic procedure is described in the Journal of Polymer Science, part A, vol. 3, pp. 2243–2257 (1965), "Alkyl-Free Cobalt Catalyst for the Stereospecific Polymerization of Butadiene"; J. G. Balas et al. Using such a calibration curve it is possible to obtain a direct indication of the active chain concentration in an active cement.

According to the '629 patent, a homogeneous solution polymerization reaction admixture is established in a reaction zone according to known procedures and using a lithium-based initiator for polymerization of vinyl arene-containing polymers wherein at least one vinyl arene unit is directly associated with a lithium ion to form "living polymer." A representative sample of the reaction mixture is withdrawn from the reaction zone. Preferably the sample is withdrawn from the reaction zone. Preferably the sample is withdrawn continously and at a high flow rate. At least a portion of the sample is passed through a measuring cell in a single cell photometer. A beam of transmitted radiation is passed through the sample containing measuring cell, after which it is split into two beams having different optical characteristics. The measuring wavelength is chosen from those strongly absorbed by the chromophore which is associated with the living chain ends, and the reference wavelength is chosen so that the active cement absorbs the radiation very weakly, or not at all. The differential absorbance of the radiation passed through the measuring cell is obtained by impinging the two beams on separate phototubes and comparing the output from the two phototubes. In the present invention, the output from the phototubes is amplified and recorded and is used to activate means for regulating the diene addition rate into the polymerization zone.

The wavelengths of transmitted radiation which are employed in the photometer are selected so that there will be a minimum of interference from chromophores other than that which it is desired to detect. In general the selected wavelengths for both the reference and sample measuring beams are within the ultraviolet and visible range of from about 1,800 to 7,000 angstroms. When desired, wavelengths from the infrared range of from about 7,000 to 14,000 angstroms may be used where active chromophores are present for this infrared range. Preferably the selected wavelength for both beams are as close to one another as possible and are in the visible and near visible range of from about 3,000 to 6,000 angstroms.

Part of the present invention involves determining the desired relative presence of the chromophore. This may be done by rigid calculation and knowledge of the kinetics involved. However, it is preferred to employ an empirical (trial and error) method to determine the desired relative chromophore presence. This empirical method involves first selecting a level based on previous experience. The higher the diene level of the polymer, the lower the photometer reading, and vice-versa. Then it is necessary to run some trials (usually two are sufficient) and measure the diene content of the polymer. Finally, the photometer target level is readjusted based on gas chromotography (GC) analyses of diene and arene. An important consideration is to maintain a constant relative disappearance of monomers at the target polymer content level throughout the reaction, resulting in simultaneous depletion of both monomers.

In a specific example (Illustrative Embodiment I), a polymer block having a monomer ratio of styrene to isoprene of 11 to 1 was desired (92% weight styrene). The desired absorbance value was determined as follows:

1. Through previous experience involving empirical trial runs, it was determined that about 2.3% of the active chromophores must be SLi active chromophores.

2. The known amount of lithium initiator required for the desired molecular weight and quantity of polymer was 483 ppm (parts per million expressed as butyllithium). Therefore, the desired concentration of styryllithium chromophores was 483×0.023 or 11.1 ppm.
3. Next it is necessary to choose a unit for sensitivity on the photometer. For purposes herein, a unit of one (1) was selected. Accordingly, for purposes herein the desired setting was 11.1 ppm styrlyllithium per unit. From historical information it was known that the absorbance per ppm styryllithium was 0.00466 abs/ppm. Accordingly, the absorbance per unit value was 11.1 ppm/unit×0.00466 abs/ppm=0.0517 abs/unit.
4. Next it was necessary to set the colorimeter sensitivity. The calibrated filter employed in Illustrative Embodiment I had a rated absorbance of 0.843. Accordingly, the colorimeter sensitivity was 0.843 divided by 0.0517 or 16.3 units (with the filter in the light path). In order to set the colorimeter sensitivity, the Kodak glass filter was placed in the light path. Then the instrument sensitivity was adjusted until the precalculated value of 16.3 colorimeter units was set. The sensitivity was then locked in.
5. The technician controls the addition rate of the diene by monitoring the colorimeter setting. The net reading (gross minus base) is controlled to 1.0 units (equivalent to 11.1 ppm styryllithium). If the reading drops below 1.0 net unit, there is too much diene being added and the technician cuts back on the diene addition rate. Specifically, the magnitude of the diene addition rate is controlled in response to the magnitude of the difference between the measured level of chromophore concentration and the desired level of chromophore concentration. In other words, the diene addition rate is decreased if the colorimeter reading decreases below the selected level and is increased if the colorimeter reading increases above the selected level. The response in the reactor is quite rapid.

If desired, a small amount of a randomizing agent may be added at about the same time (or earlier than) the lithium initiator is added. The amount added should be low enough not to effect microstructure. The randomizer, however, is not essential in the present invention. Examples of various randomizers are given in the various patents cited in the Description of the Prior Art. Specific examples of randomizers are polar compounds including dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-di-methoxyethane, dioxane, paraldehyde, dimethyl sulfide, diethyl sulfide, di-n-propylsulfide, di-n-butyl sulfide, methyl ethyl sulfide, dimethylethylamine, tri-n-propylamine, tri-n-butylamine, trimethylamine, triethylamine, N,N-dimethylamine, pyridine, quinoline, N-ethylpiperidine, N-methyl-N-ethylaniline, N-methylmorpholine, and the like. It is to be understood also that mixture of polar compounds can be employed in the practice of the instant invention. Preferred randomizers include orthodimethoxybenzene and triethylorthoacetate.

As discussed earlier the present invention may be used to make an excellent random monoalkenyl arene-diene copolymer per se or it may be used to form the first "block" in a multiblock copolymer. Such multiblock copolymers can be formed by adding additional conjugated diene monomer after all the monoalkenyl arene monomer has been polymerized (depleted). The result is an end block A comprising a random monoalkenyl arene-conjugated diene polymer block and a conjugated diene homopolymer block B. If desired the living ABLi copolymer may be coupled by known coupling techniques to form an $(AB)_{\overline{x}}BA$ multiblock copolymer. The letter x, which refers to the number of arms may be 1 or more, preferably 1 to about 10.

The invention is further illustrated by means of the following illustrative embodiments, which are given for the purpose of illustration only and are not meant to limit the invention to the particular reactants and amounts disclosed.

Illustrative Embodiment I

In Illustrative Embodiment I, a radial $(AB)_{\overline{x}}BA$ block copolymer was prepared. The A block was a random styrene-isoprene copolymer having a styrene content of 92 weight percent. The B block was an isoprene homopolymer block. In this example, 89.53 pounds of cyclohexane, 15.8 pounds of styrene and 40 grams of isoprene were charged to the reactor. Also added to the reactor was 2.2 milliliters (mls) orthdimethoxybenzene (ODMB), making the concentration 50 ppm. Then 472 mls of an 8% solution of sec-butyllithium in cyclohexane (0.08 grams butylithium per milliliter cyclohexane) was added. The remainder of the isoprene (659 grams) needed for the A block was added continuously over a thirty three minute period in response to the continuous photometer reading. An extensive series of GC (gas chromotography) analyses were taken during the run. The various conditions and results are presented below in Table I:

TABLE I

| Time Minutes | Temp °C. | Colorimeter Reading Gross | Total Isoprene added Grams | GC | |
|---|---|---|---|---|---|
| | | | | % Styrene | % Isoprene Isoprene + Styrene |
| 0 | 46.4 | 10 | 40 | 12.9 | 0.015 |
| 2 | 49.9 | 12 | 230 | 12.2 | 1.34 |
| 4 | 48.5 | 13 | 300 | 9.5 | 1.28 |
| 7 | 44.8 | 12.5 | 367 | 7.8 | 0.77 |
| 20 | 45.0 | 11 | 620 | 4.1 | 0.85 |
| 33 | 43 | 11 | 699 | 1.91 | 1.19 |

The desired gross reading on the colorimeter was 11.1. From 2 minutes to 33 minutes in the run, corresponding to 5% to 85% of total styrene conversion, the percent isoprene monomer in the reaction mixture was maintained at from about 0.8% to about 1.3% of total monomer. Meanwhile, the colorimeter indicated the presence of 1.2 to 3.8% of $S^-Li+$ chain ends.

Next, 46.1 pounds of isoprene and 201.3 pounds cyclohexane (previously titrated with 32 mls butylithium solution to remove impurities) was added to the reactor, therein forming the B blocks. After the isoprene monomer was reacted, 354 grams of 55% w pure divinylbenzene coupling agent was added. The reaction mixture was then held at 60° C. for about 30 minutes. After termination of any active sites by the addition of 2-ethylhexanol and after addition of a phenolic antioxidant, the radial $(AB)_{\overline{x}}BA$ block copolymer was stream coagulated and dried.

During the run samples were withdrawn at periodic intervals and analyzed by gas chromotography (GC). From these values a percent styrene conversion was calculated. From a smoothed-out rate plot, the number of pounds of styrene reacted were calculated. The calculation for pounds of isoprene reacted was similar, except that the amount of isoprene added to the reactor had to be taken into account. The various results are presented in Table 2 along with a calculated percentage of active polymer as SLi. In Table 3, the pounds of styrene and isoprene reacted over the various time intervals are presented and a percentage of styrene in the polymer was calculated. The results are extraordinary, and reveal the excellent control obtained by use of the present invention.

TABLE 2

| | Styrene | | | | Isoprene | | | |
|---|---|---|---|---|---|---|---|---|
| Time Minutes | GC, % Total Charge | % Converted | Lbs Reacted | Total Lbs Added | GC, % Total Charge | Lbs Remaining | Lbs Reacted | Calculated % Active Polymer as SLi |
| 0 | 12.9 | — | — | 0.88 | 0.002 | — | — | — |
| 2 | 12.2 | 12.9 | 1.87 | 0.51 | 0.166 | 0.27 | 0.24 | 2.5 |
| 4 | 9.5 | 32.1 | 4.65 | 0.66 | 0.123 | 0.19 | 0.47 | 3.8 |
| 7 | 7.8 | 44.3 | 6.42 | 0.81 | 0.061 | 0.10 | 0.71 | 3.1 |
| 20 | 4.1 | 70.7 | 10.24 | 1.37 | 0.035 | 0.06 | 1.31 | 1.2 |
| 33 | 1.91 | 86.4 | 12.51 | 1.54 | 0.023 | 0.04 | 1.50 | 1.2 |

TABLE 3

| Time Interval (min) | Lbs Styrene Reacted | Lbs Isoprene Reacted | Lbs Monomer Reacted | % Styrene in Polymer |
|---|---|---|---|---|
| 0-2 | 1.87 | 0.24 | 2.11 | 88.4 |
| 2-4 | 2.78 | 0.23 | 3.01 | 92.5 |
| 4-7 | 1.77 | 0.24 | 2.01 | 88.0 |
| 7-20 | 3.82 | 0.60 | 4.42 | 86.4 |
| 20-33 | 2.27 | 0.19 | 2.46 | 92.3 |

Illustrative Embodiment II

A similar polymer to that of Illustrative Embodiment I was prepared in this example. The only major change in the process was that there was no addition of orthodimethoxybenzene randomizer. In Illustrative Embodiment II 110 pounds of cyclohexane, ten pounds of styrene and 40 grams of isoprene were added to the reaction along with 400 mls butylithium solution. The reactor was held at about 50° C. and the additional isoprene (414 grams) was added continuously in response to the colorimeter readings. After the polymerization was complete, an additional 182.6 pounds cyclohexane and 35.9 pounds isoprene (titrated with 35 mls butyllithium) were added, therein forming the B blocks. After polymerization was completed, the polymer arms were coupled with 253 grams divinyl benzene. After coupling was complete, the solution was terminated with methanol and the radial polymer was stream coagulated and dried.

As with Illustrative Embodiment I, various samples were withdrawn from the reactor at various intervals and analyzed by GC analysis. The results are presented below in Tables 4 and 5.

As shown in Table 4, the target range for the percentage of SLi chains was substantially higher than that in Illustrative Embodiment II. The reason for this is that in Illustrative Embodiment II, there is no additional randomizing agent. Accordingly, it has been shown through experience that a greater percentage of styryllithium is required.

The polymer produced herein had an A block molecular weight of 11,500 and an AB two block molecular weight of 72,700. After coupling, the polymer had a peak molecular weight of about 540,000. Coupling efficiency was 96.8% and the homopolystyrene content was only 0.3% w. The very low homopolystyrene content is significant in that it shows very good control and the lack of significant amounts of thermal die out.

TABLE 4

| | Styrene | | | Isoprene | | | |
|---|---|---|---|---|---|---|---|
| Time/Min. | GC % | % Converted | Lbs Reacted | Lbs Added | GC % | Lbs Reacted | Calculated % SLi |
| 0 | 6.76 | 0 | 0 | 0.11 | .017 | .09 | |
| 15 | 2.98 | 55.9 | 5.6 | 0.45 | .002 | .44 | 12 |
| 20 | 2.57 | 61.2 | 6.2 | 0.57 | .018 | .55 | 10 |
| 35 | 1.68 | 75.1 | 7.5 | 0.72 | .001 | .72 | 17 |
| 50 | 1.16 | 82.8 | 8.3 | 0.80 | .001 | .80 | ~17 |
| 60 | 0.77 | 88.6 | 8.9 | 0.85 | .002 | .84 | 14 |
| 75 | 0.52 | 92.3 | 9.2 | 0.91 | .001 | .91 | 13 |
| 97 | | ~100 | ~10 | 0.99 | | .99 | 9.5 |

TABLE 5

| Time Interval (min) | Lbs Styrene Reacted | Lbs Isoprene Reacted | Lbs Monomer Reacted | % Styrene in Polymer |
|---|---|---|---|---|
| 0-15 | 5.6 | 0.44 | 6.04 | 93 |
| 15-20 | 0.6 | 0.11 | 0.71 | 85 |
| 20-35 | 1.3 | 0.17 | 1.47 | 88 |
| 35-50 | 0.8 | 0.08 | .88 | 91 |
| 50-60 | 0.6 | 0.04 | .64 | 94 |
| 60-75 | 0.3 | 0.07 | .37 | 81 |
| 75-97 | ~0.8 | 0.08 | .88 | 91 |
| TOTAL | 10.0 | 0.99 | 11 | 91 |

What is claimed is:

1. In the process for preparing anionic random copolymers, which process comprises:
   (a) adding a monoalkenyl arene monomer, minor portion of a conjugated diene monomer and an inert solvent to a reactor;
   (b) adding a polymerizing amount of an organolithium initiator to the resulting solution, therein commencing the polymerization of said monoalkenyl arene monomer; and
   (c) continuously adding a conjugated diene monomer to the solution of step (b);
   the improvement comprising controlling the rate of addition of said conjugated diene monomer in step (c) in response to the photometer measured relative presence of an active chromophore comprising a lithium ion directly associated with a poly(monoalkenyl arene) carbanion wherein the desired relative presence has been previously determined to give a desired ratio of monoalkenyl arene monomer units to conjugated diene monomer units in said copolymer.

2. The process of claim 1 wherein said monoalkenyl arene monomer is styrene and said conjugated diene monomer is selected from the group consisting of butadiene and isoprene.

3. The process of claim 2 wherein said organolithium initiator is sec-butyl lithium and said inert solvent is cyclohexane.

4. The process of claim 1 wherein the amount of conjugated diene monomer added in step (a) is ten percent by weight or less of the total amount of conjugated diene in said random copolymer.

5. The process of claim 1 wherein conjugated diene monomer is added to said reactor subsequent to the substantial depletion of said monoalkenyl arene monomer therein forming an AB block copolymer, said A block comprising a random monoalkenyl arene-conjugated diene copolymer block and said B block comprising a conjugated diene polymer block.

6. The process of claim 5 wherein said AB block copolymer is contacted with a multifunctional coupling agent, therein forming an $(AB)_{\overline{x}}BA$ block copolymer where x is one or greater.

7. In the process for preparing anionic random copolymers, which process comprises:
   (a) adding a monoalkenyl arene monomer, minor portion of a conjugated diene monomer and an inert solvent to a reactor;
   (b) adding a polymerizing amount of an organolithium initiator to the resulting solution, therein commencing the polymerization of said monoalkenyl arene monomer; and
   (c) continuously adding a conjugated diene monomer to the solution of step (b);
   the improvement comprising:
   (i) continuously sampling the solution of step (c) and determining, by use of a photometer, the relative concentration of active chromophores, said active chromophores comprising a lithium ion directly associated with a poly(monoalkenyl arene) carbanion;
   (ii) producing a first signal representative of said concentration;
   (iii) comparing said first signal to a predetermined level representative of the desired active chromophore concentration to obtain a first control signal, the magnitude of which is related to the difference between said first signal and said predetermined level; and
   (iv) adjusting the flow rate of said conjugated diene monomer to said reactor responsive to the magnitude of said control signal until the desired level of said concentration is obtained.

8. The process of claim 7 wherein said monoalkenyl arene monomer is styrene and said conjugated diene monomer is selected from the group consisting of butadiene and isoprene.

9. The process of claim 8 wherein said organolithium initiator is sec-butyl lithium and said inert solvent is cyclohexane.

10. The process of claim 7 wherein the amount of conjugated diene monomer added in step (a) is ten percent by weight or less of the total amount of conjugated diene in said random copolymer.

11. The process of claim 7 wherein conjugated diene monomer is added to said reactor subsequent to the substantial depletion of said monoalkenyl arene monomer therein forming an AB block copolymer, said A block comprising a random monoalkenyl arene-conjugated diene copolymer block and said B block comprising a conjugated diene polymer block.

* * * * *